Figure 1:
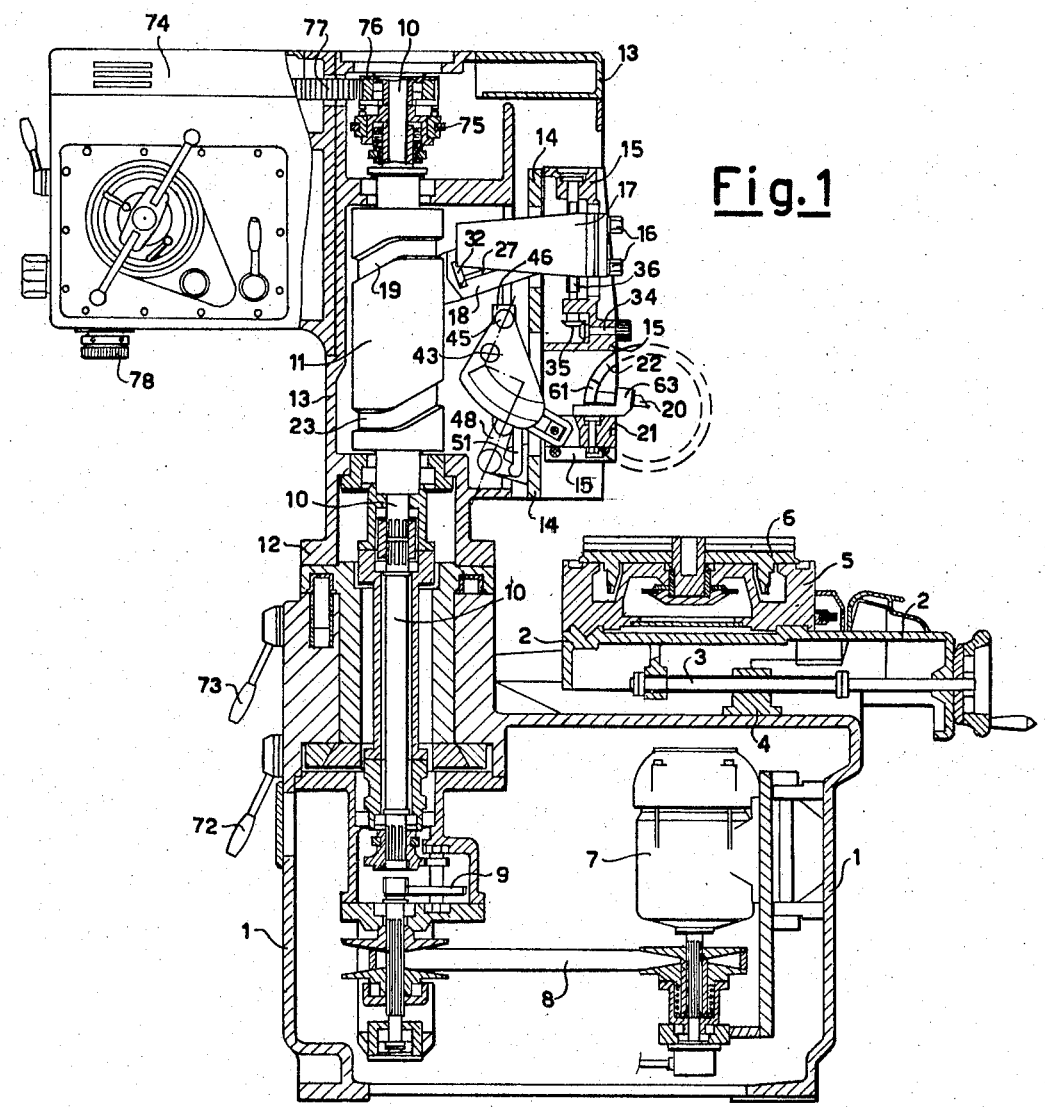

Sept. 5, 1967   D. MATTIOLI ETAL   3,339,459
MULTIPURPOSE MACHINE TOOL HAVING A TOOLHOLDER SLIDE ADAPTED
TO MOVE ON ARCUATE GUIDEWAYS
Filed Sept. 28, 1964   4 Sheets-Sheet 2

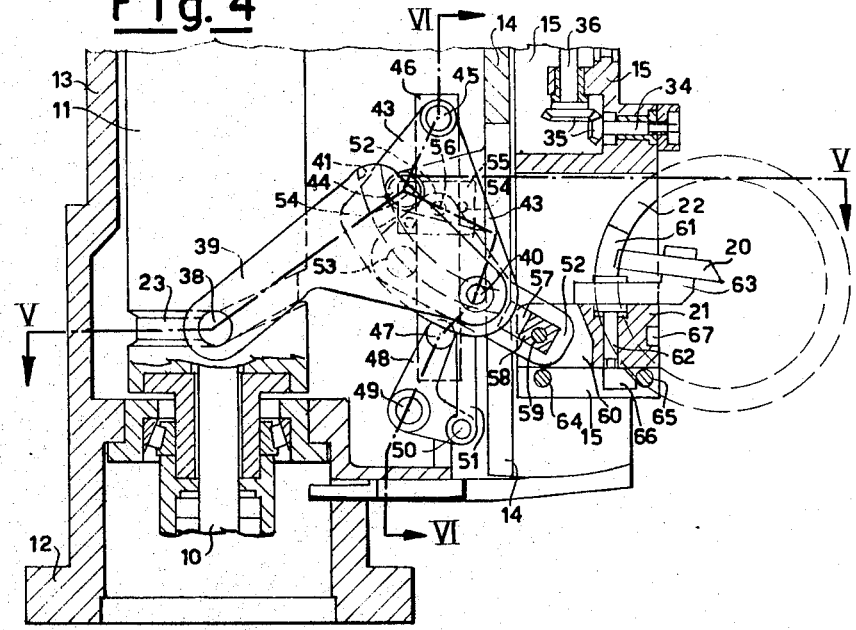
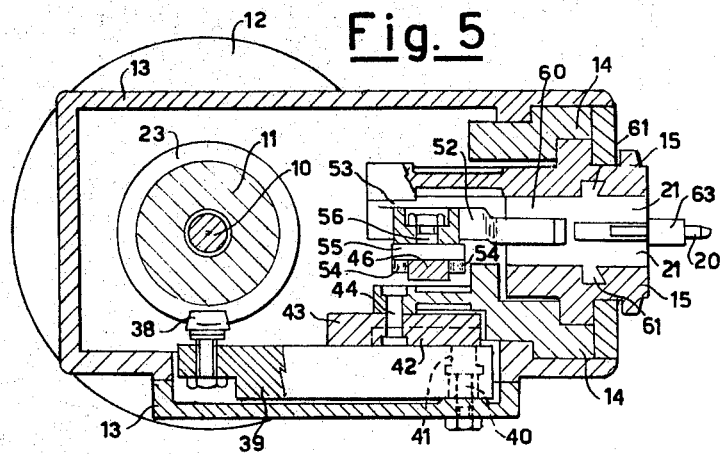

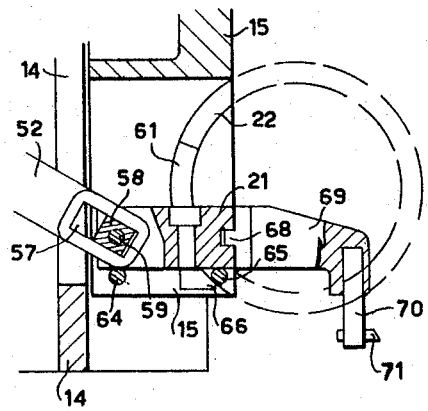
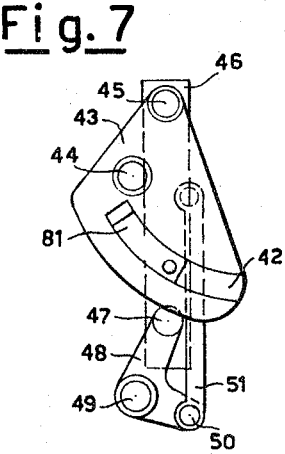
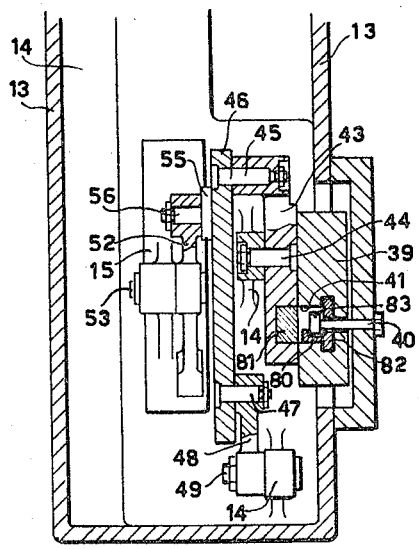

3,339,459
MULTIPURPOSE MACHINE TOOL HAVING A
TOOLHOLDER SLIDE ADAPTED TO MOVE
ON ARCUATE GUIDEWAYS
Danilo Mattioli and Giancarlo Mattioli, both of
Via Borgonuovo 10, Milan, Italy
Filed Sept. 28, 1964, Ser. No. 399,805
Claims priority, application Italy, Oct. 3, 1963,
Patent 706,147
10 Claims. (Cl. 90—26)

This invention relates to multipurpose machine tools and more particularly to a multipurpose machine tool for producing punches and dies and including a tool holder slide adapted for movement along guideways, the configuration of which is an arc of a circle with a center thereof being disposed outside the machine tool. It is well known that in machine-tools wherein a tool rotates about a horizontal axis, the axis or pivot of rotation passes through two shoulders or projecting supports between which the actual tool is suitably held. By reason of the considerable stresses to which such machine-tools are subjected, the two shoulders are located relatively close to each other. Hence, with such an arrangement it is only possible to effect operations on parts of a very reduced size, which is due to the size of the shoulders which form the projecting sections of the machine and which limit substantially both the size of the part which may be carried therebetween and the transverse displacement which it is necessary to introduce the part relative to the tool. The above arrangement results in a serious drawback which is particularly noticeable in the production of cutting dies which by reason of their shape requires an inner surface within a plate are finished by means of mechanically or more generally hand-operated files. This latter operation results in a considerable loss of time as well as an improperly finished machined surface.

In order to more clearly understand the problems reference will first be directed to the production of a punch and of a die. In both situations it is necessary to utilize a first machine for effecting the roughing, drilling and boring operations after which the punch, due to its compartively small size is shaped in a shaping machine. After a heat treatment, the punch is machined in a truing machine for eliminating any possible deformation. On the other hand, the die, after the first above-described operation is roughly machined by a band saw after which it is finished by a mechanically or hand-operated file and such operations are not entirely accurate and lastly, after a heat treatment, the die is merely machined in a truing machine for eliminating any possible deformation. It is apparent that various machines are required, which not only are different for the production of punches and dies, but each machine requires a highly skilled operator.

Furthermore, the time required for the operations and consequently the cost involved are important since it is necessary to often change the machine for the successive operative steps and in the case of the die the finishing operation by files is quite lengthy.

The essential object of the present invention is to provide a machine wherein the tip of the tool which at a certain moment rotates about a pivot and may constitute that part of the machine which projects substantially therefrom. Moreover, the shoulders or supports are so formed as to not limit appreciably the size of as well as the transverse displacement of the part being formed. In addition, the pivot of the tool should be located in proximity to the tip thereof and not in any way interfere with the machining of the part. An excellent arrangement is to shift the pivot of the tool outwardly of the machine thereby eliminating use of any lateral support.

Generally, the present invention is directed to a machine-tool for multiple purposes and which is particularly adapted for the production of punches, guides and dies and includes a head provided with a slide carrying a tool and adapted to move along guideways having configurations in the nature of arcs of a circle and are located in proximity to the front surface of the head in such a manner that the slide may describe an arc of a circle with the center thereof being shifted outwardly respecting the machine. It is particularly advantageous for the guideways to be provided in two opposed walls of a carriage adapted to traverse its support and which supports in turn may assume an inclined position by movement about a horizontal axis under the control of a rack. Thus, it is possible to transmit an oscillatory movement to the carriage on its support and a translational movement to the slide on its guideways, with the movement being controlled by cam means provided for a continuously rotating drum and which includes an adjusting means for allowing the tip of the tool to follow the desired path. The above-mentioned head may rotate about a vertical axis coinciding with the axis of the continuously rotating drum in which the cam means are formed in such a manner as to allow operation with a second head which, via an arrangement of gear-wheels known per se and selected by suitable control levers for functioning as a tracing machine, a drill, a boring member or a vertical truing member. The movement may be transmitted as required through a clutch controlled by a lever operably related to the continuously rotating drum or to the chuck of the second head and a highly accurate optical reading apparatus allows the various movements to be accurately controlled.

Numerous advantages are obtained with the present machine and the main advantage is that the position of the pivot of the tool rotating with the slide along its guideways and which is shifted outside the machine, makes it possible to machine parts without any practical limitations respecting size or shape. In particular, it is possible to effect the shaping by a tool adapted to remove shavings so as to obtain a die thus providing a finished surface in a shorter time and of far superior quality than those previously obtained by mechanically or manually operated files.

Furthermore, it is possible with a single machine actuated by a single motor, to effect all the required operations for finishing a punch or a die, except the roughing out of a die by means of a band saw. The part at any time during its machining is always subject to the optical reading apparatus which allows shifting of a magnitude of two-thousandths of a millimeter whereas the degree of accuracy of machining of a part heretofore effected by micrometers or gauges dependent upon the sensitivity of the operator. A further advantage resides in the substantial saving of time required for the finishing of a part having a concave surface and the fact that a single operator with the use of the optical reading apparatus can finish completely both a die and a punch.

Figure 2:
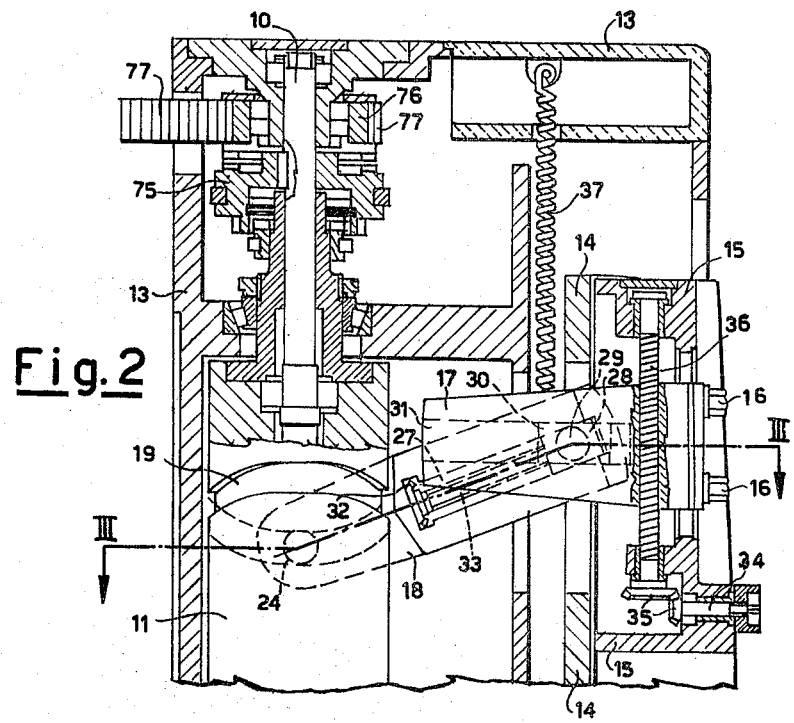
Figure 3:
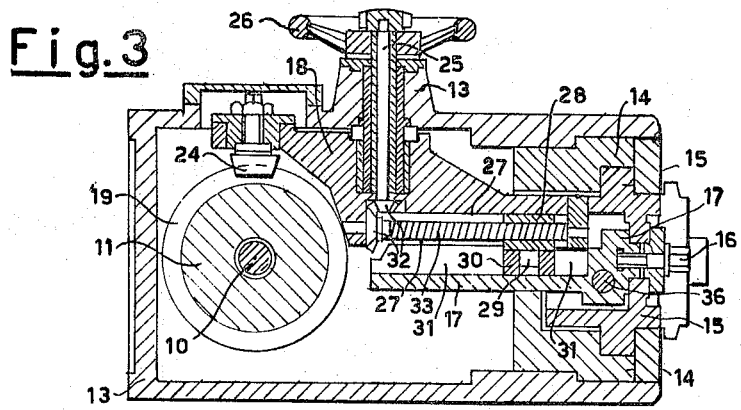

Further objects and advantages of the invention will become more readily apparent from the following detailed description and annexed drawings, and in which drawings:

FIG. 1 is partly an elevational and partly a sectional view of a machine with the shaping head in its operative position, FIG. 2 illustrates, partly in section along a vertical plane passing through the axis of the continuously rotating drum, the upper section of the shaping head, and the kinematic means adapted to transmit oscillatory movement to the carriage on its carriage holder, FIG. 3 is a cross-section taken along line III—III of FIG. 2, FIG. 4 shows in part section a vertical plane passing through the axis of the continuously rotating drum, the lower section of the shaping head, and the kinematic means adapted to transmit to the tool-holder slide a translational movement along the arcuate guide-ways formed on the carriage, FIG. 5 is a cross-section taken along line V—V of FIG. 4, FIG. 6 is a cross-section taken along line VI—VI of FIG. 4, FIG. 7 illustrates a detail of the means for adjusting the translational path of the tool-holder slide, FIG. 8 illustrates a detail of the slide carried by its guideways and to which is secured the tool adapted to shape the die.

FIG. 1 illustrates the machine as a whole with its shaping head in its operative position. A pedestal 1 carries a transverse carriage 2 controlled by a worm 3 mounted in a support 4 which is part of the pedestal in such a manner that when the worm is rotated, the carriage is shifted in a transverse direction either rapidly or within fine limits by means of a manual control. The carriage 2 provides support for a longitudinal carriage 5 whose movement is effected in a direction perpendicular to that of the carriage 2, and its movement may be controlled manually or automatically stepwise in synchronism with the movement of the tool for removing material from the part being machined. A rotary platform 6 provided on the carriage 5, adapted to rotate about its own axis in both directions either rapidly under the control of an auxiliary electric motor (not shown) or by the action of a hand-controlled wheel while subject to an optical inspection. The part to be machined is secured on the rotary platform 6 and the part may assume the desired position with reference to the tool, regardless of the nature of the tool and the position is defined through a suitable adjustment of the position of the carriages 2 and 5 and the platform.

To the pedestal 1 is secured an electric motor 7 which drives a shaft 10 through power transmitting means 8 for providing continuous modifications in speed and through a speed reducer 9 which may be activated or inactivated as required. The rotation of the shaft 10 provides for the rotation under the conditions illustrated for a drum 11.

The pedestal 1 carries via an intermediate support 12, a frame 13 of the upper section of the machine which constitutes a rotary upright. To the frame 13 is secured a support 14 for a carriage 15 and the support 14 may be held in a vertical position or in a position sloping to the rear or front by the action of a rack means (not shown) and the sloping position defines an angle of 5° with respect to the vertical. The carriage 15 is secured through screws 16 to an arm 17 adapted to be controlled by means of a lever 18 and a kinematic means to be described hereinafter, so as to oscillate in a vertical direction through the rotation of a cam slot 19 formed in the drum 11 for causing a tool 20 to have an oscillatory vertical movement imparted thereto. The tool, as will be described hereinafter, is secured to a slide 21 adapted to move along two guideways 22 having a configuration conforming to arcs of a circle provided in each of the lateral walls of the carriage 15 so that when the turret 21 is moved relative to the carriage, the top of the tool describes an arc of a circle, the radius of which increases when the tool per se projects farther beyond the pivot defined by the center of the arc of a circle defining the guideways 22. Manifestly, the tip of the tool remains stationary relative to the carriage 15, even if the slide 21 is caused to rotate, when the tip lies exactly in registry with the pivot. The displacement of the slide 21 along the guideways 22 is controlled by a cam slot 23 also formed in the rotary drum 11 and by a kinematic system also to be later described.

FIGS. 2 and 3 show the first-mentioned kinematic means adapted to control the movement on the support 14 of the carriage 15 and the tool. To accomplish this end, the cam 19 engages a roller 24 for transmitting an oscillatory movement to the lever 18 whose stationary pivot is defined by the axis of a shaft 25 of a small handwheel 26 (FIG. 3). The lever 18 is provided with a longitudinally extending T-shaped groove 27 engaging a block 28 freely connected through a pivot 29 to a second block 30 adapted to travel freely in a guideway 31 formed in the arm 17, secured to the carriage 15. Thus, for instance, when rotation of the drum 11 causes the roller 24 to rise, the lever moves about the shaft 25 to lower the block 28 which also lowers the block 30 and the block 30 travels along the guideway 31. The translational movement of the arm 17 results in a lowering of the carriage 15. As the drum continues rotating, the kinematic means causes the carriage to effect a reciprocatory movement the amplitude of which is determined by the spacing existing between the block 28 and the pivotal axis of the lever 18. However, if it is desired to increase the travel of the carriage 15, it is necessary to rotate in the desired direction the small handwheel 26 which by the shaft 25 and a bevel wheel 32 causes a worm 33 to rotate and the worm engages a tapped bore formed in the block 28. Consequently, the block 28 is shifted the desired amount relative to the pivotal axis of the lever 18 and the stroke of the tool carried by the carriage 15 is correspondingly increased. The stroke of the tool by thus having a suitably adjusted amplitude, it is possible to displace the actual stroke at different locations relative to the rotary platform 6 carrying the part to be machined in accordance with the size of the part and the particular type of operation to be performed. For instance, it may be desired to lower the location of the travel of the tool in a situation where the amplitude of travel has been previously ascertained. For this purpose, the screws 16 are backed off so that a wrench can be used to rotate the shaft 34 in the desired direction for causing bevel wheels 35 to rotate a worm 36 located within a tapped bore formed in the arm 17. Thus, the carriage 15 is constrained to move downwardly relatively to the arm 17 after which the screws 16 are drawn up and the tool may operate again over a stroke of the same length as defined hereinabove, but which has been shifted downwardly. In order to prevent the weight of the carriage or the arm 17 from depressing the lever 18, there is secured above the arm ends of a pair of springs 37 with other ends of the springs being secured to the frame 13. Obviously, in the event the carriage 15 should not have an oscillatory movement imparted thereto, it is merely to shift the block 28 so that the pivot 29 has its axis in registry with the pivotal axis of the lever 18.

With reference to FIGURES 4 to 6, there is disclosed the kinematic means for transmitting a rotary movement to the slide 21 for causing such slide to rotate about a fulcrum positioned exteriorly of the tool. The cam slot 23 of the rotary drum 11 (FIGS. 4 and 5) engages a roller 38 connected with one end of a lever 39 rotatable about a pivot 40 located near its other end, and the lever 39 is thus pivotally secured to the frame 13. The lever 39 is provided with a T-shaped groove 41 having a configuration corresponding to an arc of a circle, and the groove 41 is engaged by a block 82 illustrated in FIG. 6 having a configuration complementary to that of the groove 41. The groove 41 is provided inwardly with a recess carrying a semi-circular rack 80 which allows the block when shifted along the groove 41 to actuate a gear 83 controlled by the pivot 40. A second block 81 is freely connected by a pivot in a manner somewhat similar to the arrangement of the blocks 28 and 30 illustrated in FIGS. 2 and 3. The second block 81 engages an arcuate groove 42 similar to that in the lever 39, and the groove 42 is formed in a lever 43 pivotally secured through a pivot 44 to the carriage support 14. The upper end of the lever 43 is movably connected by a pivot 45 with the upper end of a vertical bar 46. The lower end of the bar 46 is pivotally connected by a pivot 47 with one end of an L-shaped crank 48 pivotally secured to a pivot 49. The arrangement is such that the spacing between the pivots 44 and 45 is equal to the distance between the pivots 47 and 49 while the line connecting the pivots 44 and 45 is parallel with that connecting the pivots 47 and 49. Thus, regardless of the movement imparted to the lever 43, the bar 46 rises or falls while it is shifted laterally but remains permanently parallel with its axis so that it is always vertically disposed.

The other end of the L-shaped crank 48 is connected through a pivot 50 with a link 51, the other end of the link being fulcrumed through a further pivot to a lever 52 which is in turn fulcrumed at 53 to the carriage 15 in such a manner that the straight line section connecting the pivots 49 and 50 is equal to and parallel with the straight line section connecting the pivot 53 with the upper pivot carried by the link 51. Consequently, the link 51 coacts in the shifting of the lever 52 to overcome any resistance imparted and thus remains parallel and as a result vertically throughout the operation of the machine. This constitutes with the bar 46, the lever 43 and the crank 48 what might be termed a pantograph unit. Along the bar 46 and engaging the latter by means of three rollers 54, there is provided a movable driving carriage 55 connected through a pivot 56 with the lever 52 which is provided at its end remote from the pivot 53 with a slot 57 in which a block 58 is slidingly engaged during the operation of the machine. The block 58 is connected through a pivot 59 with two arms 60 rigid with the slide 21. The slide is provided along its opposite sides or surfaces with two guides 61 having a configuration conforming to an arc of a circle. The guides are adapted to extend along the guideways 22 since they have an arcuate shape such that the center of rotation or the fulcrum of the slide 21 lies at a point located exteriorly of the machine. A tool-holder 63 is secured to the slide 21 through a strap 62 and the tool-holder carries the tool 20. As shown in the drawings, the slide 21 lies at the lowermost point of its rotary movement and more specifically in the position in which the carriage 15 driven by the cam slot 19 has reached the lowermost point of its travel. Under such conditions, the slide 21 engages rearwardly a stop 64 rigidly connected with the carriage 15, and the front of the slide engages a further stop 65 also rigidly connected with the carriage, with the slide engaging last-mentioned stop through a tooth 66.

Referring to FIGURE 4, and assuming that the drum 11 rotates in the counterclockwise direction, the roller 38 rises along the cam 23 while the lever 39 rotates clockwise about its pivot 40 so that the block 82 which is held fast in the groove 41 is shifted vertically and upwardly. At the same time, the second block 81 which is connected therewith through a pivot, is shifted also upwardly along the groove 42 and the lever 43 is thus caused to rotate anti-clockwise about its pivot 44. This rotation produces a rising movement together with a leftward translational movement of the bar 46 and the link 51 connected therewith through the L-shaped crank 48. This causes a leftward shifting of the carriage 55, the pivot 56 on which describes an arc of a circle about a point of the axis of the pivot 53 so that the lever 52 effects an anti-clockwise rotation about its pivot 53. The result of this rotation is that the block 58 is raised with reference to the position illustrated in FIG. 4 by moving along the slot 57 so that the slide 21 is constrained to rise, which causes the slide to move along an arc of a circle defined by the guideways 22. The amplitude of the rotary shifting of the slide 21 is defined by the position of the block 82 secured in the groove 41 with reference to the actual pivot 40 of the lever. When the block 82 registers with the fulcrum 40, the rotation of the drum 11 transmits no movement to the slide 21 whereas the amplitude of the rotary shifting of the slide increases with an increase in the distance between the block 82 and the fulcrum 40. This is obtained readily by using a wrench to rotate the pivot 40 carrying at its inner end the gear 83 engaging the rack 80 formed in the small block 82 as readily apparently from FIG. 6.

Obviously, when the tip of the tool 20 lies exactly at the center of the rotary movement of the slide 21, it remains stationary with reference to the carriage whereas the tip moves over an arcuate line, the center of which lies at the center of rotation of the slide, with the radius of the circle increasing when the distance of the tip with reference to the fulcrum increases.

If it is desired to produce a punch, and as already explained, the position and length of the travel of the carriage is defined with reference to the support of the carriage and the radius of the arc of a circle defining the tapering section is also selected by giving the desired extent of projection to the tool with reference to the pivot of the tool. The kinematic system controlling the rotary movement of the slide 21 is then adjusted in such a manner that the movement may have a predetermined amplitude, taking into account the length of the arc of a circle to be effected by the tip of the tool. Under such conditions, it should be assumed that the tool lies at the highest point of its travel and that the drum 11 rotates. The slide 21 is then in the portions illustrated in FIG. 4 and bears on the stops 64 and 65. The slide is secured to the stop 65 by the tooth 66. The shape imparted to the cams 19 and 23 should be such that while the roller 24 moves over an upwardly directed section of the cam 19 so as to produce the lowering of the carriage, the roller 38 travels over a horizontal section of the cam 23 so that the position of the tool with reference to the carriage may remain stationary in the position illustrated in FIG. 4 while the actual tool cuts the vertical cylindrical section of the punch. Since the tip of the tool lies beyond its fulcrum, the result is that the stresses exerted from a system of forces are applied to the two stops 64 and 65. At the end of the operation, the roller 24 begins to travel along a horizontal section of the cam 19 so that the carriage remains stationary at the lowermost point of its travel while the roller 38 begins to rise along the cam 23 and causes a rotary and rising movement of the slide 21 so that the tip of the tool cuts the tapering section of the punch while the shavings produced thereby are simultaneously removed. At such a moment, the operations are reversed and the tool returns upwardly to its starting position with its tip remaining at a distance from the wall of the punch whereby the tip can no longer be damaged or broken by moving in a direction opposite to that of its actual cutting operation over the surface of the punch.

The same shaping head already described may also serve in a particularly advantageous manner for the shaping of dies in which the inner shape is a cylindrical surface cut along the desired outline from a metal plate. The cylindrical surface is interrupted by a flaring section adjacent the outer surface of the plate so that it is an easy matter to remove the die from the part which has been roughly formed by the punch in the actual die.

In such a case, and after having secured the metal plate to be shaped in a desired position on the rotary platform 6 and assuming that the tool fitted on the shaping head is the same as that which has served for effecting the punch, the strap 62 is removed (FIG. 4) together with the tool-holder 63 and the tool 20 from the slide 21, while there is inserted in the front groove 67 of the slide 21 a projection 68 (FIG. 8) of a suitable tool-holder 69 carrying a stem 70 to which is secured the tool 71. As shown in FIG. 8, the tool is shifted into a position beyond the fulcrum and results immediately in that it forms the outermost part of the whole machine tool, whereby the shaping operation is no longer limited or prevented by the problems relating to the size of the die or other questions deriving from mass conditions. The fact that the tip of the tool lies beyond the fulcrum leads to further advantages which are obviously the same as in the case of the tool used for the production of punches. Among such advantages, it should be mentioned that when the tip of the tool reaches a point of contact during its downward movement with the surface of the part to be produced, the actual tip has a tendency to bite excessively into the material which is being cut. The reason therefore is that there is applied to the tip a force directed upwardly which has a tendency to make the tip rotate about its fulcrum while in the case where the tip lies behind its fulcrum or behind its material fulcrum as may occur in the case of the prior shaping machines, the tip would have a tendency to move away from contact with the part so as to adversely affect the cutting operation thereby leading to difficult problems derived from a series of flexional movements and auxiliary stresses in the tool-holder and the control system. Furthermore, the fact that the tool tip lies beyond its fulcrum is such that the slide 21 bears, during operation, on the stops referred to so that it may thus resist the large forces exerted thereon without any risk of shifting the slide back as would be the case if the tip was to lie inwardly of its fulcrum.

During the production of the die, the tool 71 lowers, in a manner already described, in a vertical direction together with the carriage, and the sole difference is the fact that the die is first shaped throughout its thickness along a cylindrical surface. Once a downward travel corresponding to the thickness of the die has been effected, the carriage stops and, at such a moment, the cam 23 causes, as already described, the slide 21 to rotate along the guideways 22 to remove the tip away from the die. Thus, the tool may rise without engaging or pressing in an undesired manner the surface of the actual die. When the cylindrical surface has been finished, the support 14 of the carriage rotates through a rack system which has not been illustrated, the carriage and the tool rotating with the support about a horizontal axis after which the machine starts again and since the tool moves along a sloping line thus defined, the flaring section of the die already referred to is cut by the tool.

The machine illustrated in FIG. 1 shows numerous applications other than those specifically described. In fact, by raising (FIG. 1) a locking lever 72 and a positioning bolt 73, it is possible to make the frame 13 rotate through 180° with the same simplicity and speed about a vertical axis registering with the axis of the shaft 10. Thus, a head 74 is caused to lie above the rotary platform 6, with the head 74 being locked in the desired position by lowering the parts 73 and 72. By a lever (not illustrated) it is possible to raise or lower a clutch arrangement 75 in such a manner that the rotation of the shaft 10 may be transmitted when desired to the drum 11 or in the case of the frame 13 having now rotated through 180° with reference to the position illustrated in FIG. 1, to the pulley 76 which, through a belt 77 transmits movement through a gear mechanism and not illustrated to the mandrel 78. To the mandrel it is possible to secure from time to time, various tools through which and, upon a mere actuation of suitable levers which are not illustrated, the actual mandrel assumes a well-defined operative movement so that it is possible with the same head 74, to effect in succession various operations such as roughing out, boring, drilling and truing vertically a part.

It is apparent that with the use of the single machine illustrated in FIG. 1, it is possible to effect all the operations which are necessary, for instance for producing and finishing both a die and a punch while the accuracy of the operation is substantially improved by an accurate apparatus for optical reading associated with the machine and which, being known per se, need not be illustrated.

The invention is not to be confined to any strict conformity to the showings in the drawings but changes or modifications may be made therein so long as such changes or modifications mark no material departure from the spirit and scope of the appended claims.

We claim:

1. In a machine-tool for producing dies, punches and like articles, a head, a slide for carrying a tool, and an arcuate guiding member for the slide carried by the head with the center of said guiding member lying permanently outside the machine-tool.

2. In a machine-tool for producing dies, punches and like articles, a head, a slide for carrying a tool, a carriage operably related to said head and adapted to execute a reciprocatory rectilinear movement relative to the head, said carriage including an arcuate guiding member for the slide having a center which lies permanently outside the machine-tool and means operably associated with said guiding member and slide for holding said slide in an adjustable angular position.

3. In a machine-tool for producing dies, punches and like articles, a head, a slide for carrying a tool, a support adapted to assume relative to the head a vertical position and at least one inclined position to either side of such vertical position, a carriage operably related to said head and adapted to execute a longitudinal reciprocatory movement relative to the support, said carriage including an arcuate guiding member for the slide having a center which lies permanently outside the machine-tool and means operably associated with said member and slide for holding said slide in an angularly adjustable position.

4. In a machine-tool for producing dies, punches and like articles, a head, a slide for carrying a tool, a support adapted to assume relative to the head a vertical position and at least one inclined position to either side of such vertical position, a carriage operably related to said head and adapted to execute a longitudinal reciprocatory movement relative to the support, said carriage including an arcuate guiding member for the slide having a center which lies permanently outside the machine-tool, means operably associated with said guiding member and slide for holding said slide in an angularly adjustable position, a drum rotatable about a vertical axis and having two peripheral cam grooves therein, and means actuated by said grooves for controlling selectively the reciprocation of the carriage and the angular position of the slide in the guiding member.

5. The machine tool as claimed in claim 4 in which said last named means includes first and second grooved levers, and two pivotally interconnected blocks slidably mounted in the grooves in the corresponding levers for interconnecting the levers with the position thereof in the grooves determining the amplitude of the rotary movement of the slide.

6. The machine tool as claimed in claim 4 in which said last named means includes a longitudinally slotted transverse arm operably connected to the carriage, a slotted lever controlled by one of said grooves, two pivotally interconnected blocks slidably mounted in the grooves in the arm and lever for interconnecting the lever and means for shifting the block in the slot of the lever for adjusting the amplitude of reciprocation of the carriage.

7. The machine tool as claimed in claim 4 including screw means for releasably and adjustably securing the arm to the carriage for allowing a relative shifting therebetween.

8. The machine tool as claimed in claim 4 including means for rotating said head about the axis of said drum and out of an operative position and an auxiliary head operably related to said first head for rotation therewith about said drum axis into and out of an operative position.

9. The machine tool as claimed in claim 8 including clutch means for selectively transmitting movement to said drum and auxiliary head in accordance with which head is operative.

10. The machine tool as claimed in claim 4 including an optical reading means for defining the positions of the carriage and slide.

References Cited

UNITED STATES PATENTS 3,183,779   5/1965   Nagel _____ 90—11

RICHARD H. EANES, JR., *Primary Examiner.*